(12) United States Patent
Zhou et al.

(10) Patent No.: US 9,406,063 B2
(45) Date of Patent: Aug. 2, 2016

(54) SYSTEMS AND METHODS FOR MESSAGING, CALLING, DIGITAL MULTIMEDIA CAPTURE, PAYMENT TRANSACTIONS, GLOBAL DIGITAL LEDGER, AND NATIONAL CURRENCY WORLD DIGITAL TOKEN

(71) Applicants: Dylan T X Zhou, Tiburon, CA (US); Andrew H B Zhou, San Gabriel, CA (US); Tiger T G Zhou, Tiburon, CA (US)

(72) Inventors: Dylan T X Zhou, Tiburon, CA (US); Andrew H B Zhou, San Gabriel, CA (US); Tiger T G Zhou, Tiburon, CA (US)

( * ) Notice: Subject to any disclaimer, the term of this patent is extended or adjusted under 35 U.S.C. 154(b) by 0 days.

(21) Appl. No.: 15/040,466

(22) Filed: Feb. 10, 2016

(65) Prior Publication Data
US 2016/0162873 A1   Jun. 9, 2016

Related U.S. Application Data

(63) Continuation-in-part of application No. 14/815,988, filed on Aug. 1, 2015, which is a continuation-in-part of application No. 13/760,214, filed on Feb. 6, 2013, now Pat. No. 9,016,565, which is a continuation-in-part of application No. 13/623,944, filed on Sep. 21, 2012, which is a continuation-in-part of application No. 13/620,775, filed on Sep. 15, 2012, now abandoned, which is a continuation-in-part of application No. 13/343,044, filed on Jan. 4, 2012, now abandoned, which is a continuation-in-part of application No. 13/287,279, filed on Nov. 2, 2011, now abandoned, which is a continuation-in-part of application No. 12/749,412, filed on Mar. 29, 2010, now abandoned.

(60) Provisional application No. 60/415,546, filed on Oct. 1, 2002.

(51) Int. Cl.
| | | |
|---|---|---|
| *G06Q 20/00* | (2012.01) | |
| *G06Q 20/32* | (2012.01) | |
| *G06Q 20/16* | (2012.01) | |
| *G06Q 20/38* | (2012.01) | |
| *G06Q 20/36* | (2012.01) | |
| *G06Q 20/22* | (2012.01) | |
| *G06Q 20/20* | (2012.01) | |
| *G06Q 20/40* | (2012.01) | |

(52) U.S. Cl.
CPC ......... *G06Q 20/3227* (2013.01); *G06Q 20/204* (2013.01); *G06Q 20/223* (2013.01); *G06Q 20/3276* (2013.01); *G06Q 20/363* (2013.01); *G06Q 20/367* (2013.01); *G06Q 20/3674* (2013.01); *G06Q 20/3827* (2013.01); *G06Q 20/3829* (2013.01); *G06Q 20/401* (2013.01); *G06Q 20/4012* (2013.01); *G06Q 20/40145* (2013.01); *G06Q 2220/00* (2013.01)

(58) Field of Classification Search
CPC . G06Q 20/16; G06Q 20/322; G06Q 20/3274; G06Q 20/3829; G06Q 20/401; G06Q 20/40145; G04M 1/72519; G04M 1/72555
See application file for complete search history.

(56) References Cited

U.S. PATENT DOCUMENTS

| 9,098,190 B2 * | 8/2015 | Zhou | G06Q 20/3829 |
|---|---|---|---|
| 2005/0240432 A1 * | 10/2005 | Jensen | G06Q 20/10 |
| | | | 705/39 |

(Continued)

*Primary Examiner* — Daniel Walsh
(74) *Attorney, Agent, or Firm* — Steven A. Nielsen; www.NielsenPatents.com

(57) ABSTRACT

Provided are computer implemented methods and systems for using a global world universal digital mobile and wearable currency. The method commences with receiving a transfer request. The transfer request is associated with an amount represented in tokens of the global world universal digital mobile and wearable currency. The transfer request includes at least a sender account, a recipient account, and the amount. The method continues with transferring the amount from the sender account to the recipient account based on the transfer request.

30 Claims, 9 Drawing Sheets

(56) References Cited

U.S. PATENT DOCUMENTS

| | | | |
|---|---|---|---|
| 2010/0332404 A1* | 12/2010 | Valin | G06Q 30/0239 705/310 |
| 2011/0218916 A1* | 9/2011 | Barber | G06Q 20/10 705/44 |
| 2013/0024379 A1* | 1/2013 | Di Tucci | G06Q 20/10 705/44 |
| 2013/0218721 A1* | 8/2013 | Borhan | G06Q 20/322 705/26.41 |
| 2014/0129457 A1* | 5/2014 | Peeler | G06Q 30/018 705/317 |
| 2014/0316768 A1* | 10/2014 | Khandekar | G06F 17/30654 704/9 |
| 2015/0006265 A1* | 1/2015 | White | G06Q 30/0629 705/14.3 |
| 2015/0073907 A1* | 3/2015 | Purves | G06Q 20/32 705/14.58 |
| 2015/0324764 A1* | 11/2015 | Van Rooyen | G06Q 20/3678 705/69 |
| 2016/0012465 A1* | 1/2016 | Sharp | G06Q 20/18 705/14.17 |
| 2016/0034887 A1* | 2/2016 | Lee | G09G 5/12 705/39 |
| 2016/0086175 A1* | 3/2016 | Finlow-Bates | G06Q 20/401 705/77 |

* cited by examiner

SYSTEMS AND METHODS FOR MESSAGING, CALLING, DIGITAL MULTIMEDIA CAPTURE, PAYMENT TRANSACTIONS, GLOBAL DIGITAL LEDGER, AND NATIONAL CURRENCY WORLD DIGITAL TOKEN

CROSS-REFERENCE TO RELATED APPLICATIONS

This application is a continuation-in-part of U.S. patent application Ser. No. 14/815,988, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Aug. 1, 2015, which is a continuation-in-part of U.S. patent application Ser. No. 14/034,509, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 23, 2013, which is continuation of U.S. patent application Ser. No. 10/677,098, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 30, 2003, which claims priority to U.S. Provisional Patent Application No. 60/415,546, entitled "DATA PROCESSING SYSTEM", filed on Oct. 1, 2002, which are incorporated herein by reference in their entirety.

FIELD

This application relates generally to data processing and, more specifically, to global world universal digital mobile and wearable currency image token and ledger.

BACKGROUND

National currencies provide a system to define values within the borders of a country. However, outside the borders of the country other values are effective, and currency exchange depends on fluctuating exchange rates. With a globalization of economy and growth of international operations, these inconveniencies become more outstanding, interfere with retail transactions and add some level of dissatisfaction.

Additionally, with the occurrence of peer-to-peer money transfer, an ordinary person can participate in financial operations. An Internet connection allows performing transactions worldwide. However, exchange costs, banking costs, and various fees related to transactions in physical currencies may be considerable.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer implemented methods and systems for using a global world universal digital mobile and wearable currency. The system for using a global world universal digital mobile and wearable currency comprises at least one processor and a database in communication with the processor. The processor may be operable to receive a transfer request from a sender. The transfer request may include a sender account, a recipient account, an amount to be transferred, and other data. The amount may be represented in tokens of the global world universal digital mobile and wearable currency. Based on the transfer request, the amount is transferred from the sender account to the recipient account. Both the sender account and the recipient account are associated with the global world universal digital mobile and wearable currency, so the transfer is performed without any commissions, banking fees, exchange fees, and so forth. The database may be configured to store data related to the sender account and the recipient account, and comprise computer-readable instructions for execution by the processor.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, numerous specific details are set forth in order to provide a thorough understanding of the presented concepts. The presented concepts may be practiced without some or all of these specific details. In other instances, well-known process operations have not been described in detail to avoid unnecessarily obscuration in the described concepts. While some concepts will be described in conjunction with the specific embodiments, it will be understood that these embodiments are not intended to be limiting.

Various computer implemented methods and systems for using a global world universal digital mobile and wearable currency are described herein. Recent proliferation of mobile and wearable devices (e.g., a mobile phone, a smartphone, a tablet personal computer, a laptop, a wearable personal digital device, and other similar devices) that are capable of transmitting and receiving data via a network allows implementing these methods and systems. Most users of mobile and wearable devices enjoy message communication with other users, as well as performing and receiving payments using the mobile and wearable devices.

The methods and system of the present disclosure refer to a cross-platform system for using a global world universal digital mobile and wearable currency for mobile and wearable devices. A cross-platform application can be directly run on any platform without special preparation. In particular, the cross-platform system for using a global world universal digital mobile and wearable currency for mobile and wearable devices may run on Android, iOS, BlackBerry OS, Symbian, Windows Phone, and so forth. The methods and systems for using the global world universal digital mobile and wearable currency for mobile and wearable devices of the present disclosure provide a way to avoid obstacles and expenses related to mobile peer-to-peer payments in international and domestic environment. A digital currency being the basis of the system for using the global world universal digital mobile and wearable currency for mobile and wearable devices enables worldwide peer-to-peer transactions between the users without banking commissions, legal boundaries, and currency exchange expenses.

The methods described herein may be performed by any mobile devices with wireless communication capabilities. In addition to being capable of transmitting voice-based signals, many modern cell phones have internet connectivity using cellular networks (e.g., 3G, 4G) as well as Wi-Fi and other types of networks. Some additional examples of such networks are described below with reference to FIG. 1. Wireless communication may be used to transmit retrieved product information to a payment server, receive replies, and transmit authorizations. Overall, various data may be exchanged between the mobile and payment server as well as other servers during operations of the method.

Figure 1:
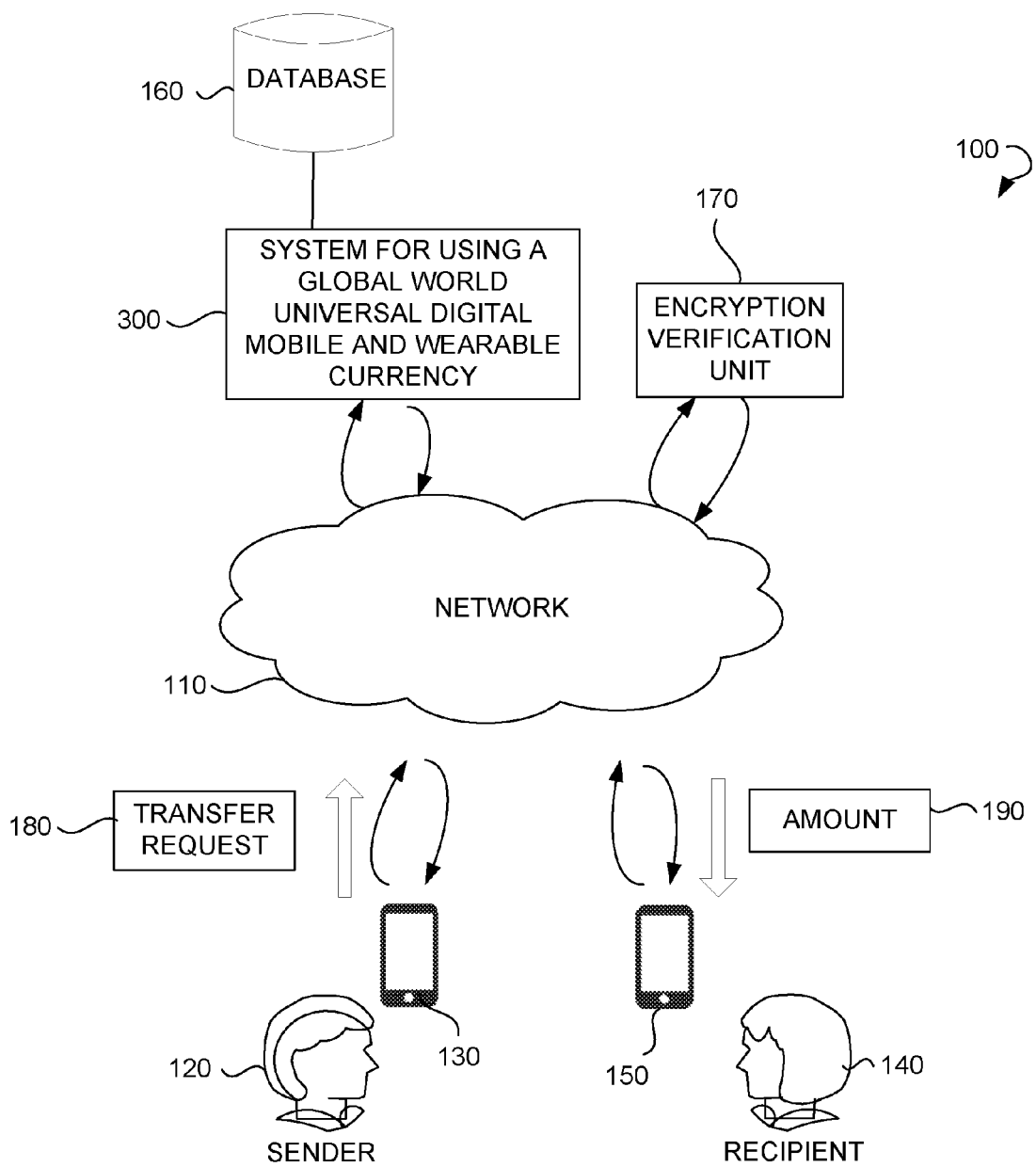
FIG. 1 is a block diagram illustrating an example of the overall system in which various embodiments may be implemented.

Referring now to the drawings, FIG. 1 illustrates an environment 100 within which a method and a system for using a global world universal digital mobile and wearable currency for mobile and wearable devices can be implemented. The environment 100 includes a network 110, a sender 120, a sender digital device 130, a recipient 140, a recipient digital device 150, a system 300 for using a global world universal digital mobile and wearable currency for mobile and wearable devices, a database 160, and an encryption verification unit 170. The sender digital device 130 and the recipient digital device 150 include a mobile phone, a laptop, a personal computer (PC), a tablet PC, a smart phone, a wearable personal digital device, a wearable eyeglass communication device, and so forth.

The network 110 includes the Internet or any other network capable of communicating data between devices. Suitable networks includes or interface with any one or more of, for instance, a local intranet, PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an MEN (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 includes a network of data processing nodes that are interconnected for the purpose of data communication.

The sender 120 includes a person who transfers an amount 190 to the recipient 140. The amount 190 is associated with a digital currency. The sender 120 specifies the amount 190 to be transferred to the recipient 140 and recipient data. Based on the amount 190 and the recipient data, a transfer request 180 is formed and sent to the system 300. The transfer request 180 may be associated with one or more of a transactional payment based on Unstructured Supplementary Service Data (USSD), Short Message Service (SMS), direct operator billing, a credit card mobile payment, an online wallet, a Quick Response (QR) code payment, contactless near field communication payments, a cloud-based mobile payment, an audio signal-based payment, a Bluetooth Low Energy (BLE) signal beacon payment, an in-application payment, a Software Development Kit (SDK) payment, an Application Programming Interface (API) payment, a social networking payment, and a direct carrier and bank co-operation.

The system 300 processes the transfer request 180 and transfers the amount 190 from a sender account to the recipient account. The encryption verification unit 170 encrypts data associated with the transfer request 180 and the transfer.

In some embodiments, the network 110 may include a codebase. A node on the network 110 may receive a message informing about a new transaction, and verification that transaction follows the rules of the network 110 may be performed. If the transaction is valid, the transaction may be added to a current My Block message. The message may be serialized to binary, hashed and then the node may make an RPC to token telling it what the current extra hash is. When token finds a token-format block of the right difficulty for the network 110, it may pass the code block header, token base transaction and merkle branch to it. The node may combine them together into a Data message, which may be then glued together with an alternative chains code block. This "super code block" may be then broadcast via an independent P2P network. When the node on a new network receives a super code block it may do the following things: verify if My Block contents are correct, i.e., that the transactions follow the rules; verify if My Block previous hash makes it fit in the code block file chain and that the difficulty is correct; hash My Block structure and then verify that this hash appears in the Database scriptSig, in the right place; extract the merkle root of the token format block from the header and then verify that the base tx provided did, in fact, exist in that code block (using the branch, root, tx and header together); verify that the hash of the format block header is below the difficulty found in My Block structure.

The system 300 may further include a code block file chain (not shown). The code block file chain may include a transaction database shared by all nodes participating in the system 300. Token transactions may be permanently recorded in the code block file chain. Approximately six-ten times per hour, a group of accepted transactions, a code block, may be added to the code block file chain, which may be quickly published to all network nodes. This allows determining when a particular token amount has been spent for preventing double-spends in a peer-to-peer environment with no central authority. Whereas a conventional ledger records the transfers of actual bills or promissory notes that exist apart from the ledger, the code block file chain may be the only place that tokens can be said to exist. In order to independently verify the chain-of-ownership of any and every token amount, full-featured token software may store its own copy of the code block file chain.

The code block file chain may include a transaction database shared by all nodes participating in the system 300 based on the same protocol. A full copy of the code block file chain may contain every token transaction ever executed. With this information, one can find out how much value belonged to each address at any point in history.

Every code block may contain a hash of a previous code block. This may have the effect of creating a chain of code blocks from a genesis code block to a current code block. Each code block may be guaranteed to come after a previous code block chronologically because the hash of the previous code block would otherwise not be known. Each code block may also be computationally impractical to modify once it has been in the code block file chain for a while, because every subsequent code block would also have to be regenerated. These properties may make double-spending of tokens very difficult.

In some embodiments, one may build onto a code block (by referencing the code block in code blocks that are create) if the code block is the latest code block in the longest valid code block file chain. "Length" may be calculated as total combined difficulty of the code block file chain, not the number of code blocks. The code block file chain may be valid if all of the code blocks and transactions within the code block file chain are valid, and only if the code block file chain starts with a genesis code block.

In some embodiments, for any code block on the chain, there may be only one path to a genesis code block. Coming from the genesis code block, however, there may be forks. One-code block forks may be created from time to time when two code blocks are created just a few seconds apart. When that happens, generating nodes may build onto whichever one of the code blocks they received first. Whichever code block ends up being included in the next code block may become a part of the main chain because that chain is longer.

In some embodiments, code blocks in shorter chains or invalid chains) may not be used for anything. When the system 300 switches to another, longer chain, all valid transactions of the code blocks inside the shorter chain may be re-added to the pool of queued transactions and may be included in another code block. The reward for the code blocks on the shorter chain may not be present in the longest chain, so they may be practically lost, which is why a network-enforced 100-block maturation time for generations may exist.

In some embodiments, because a code block can only reference one previous code block, it is impossible for two forked chains to merge.

In some embodiments, it is possible to use the code block file chain algorithm for non-financial purposes.

In some embodiments, a token may have the shape of a coin and may be used in money circulation.

Furthermore, the currency token may use a standard hashing function over a document. A digital signature converted document may generate a public hash that can be cryptographically proven to have originated from a specific document uploaded by a specific person at a specific time. By uploading the resulting character hash with a tiny transaction on the currency token code block file chain, the proof of that document origin and ownership may exist as long as the currency token does. It can be instantly and securely verified, and the proof is impossible to erase or change.

In some embodiments, tokens may allow storing assets on the code block file chain. A user may have an IPO (Initial Public Offering) on the code block file chain by issuing shares as tokens, and send the tokens to shareholders. The shares may then be traded almost instantaneously and for free through the code block file chain. Smart properties may be represented by tokens. One may store a house on the code block file chain by issuing a single token, then the ownership of the house may be transferred with a simple code block file chain transaction.

In some embodiments, an alternative code block file chain may be provided. The alternative code block file chain may include a system using a code block file chain algorithm to achieve distributed consensus on a particular topic. The alternative code block file chain may share token holders with a parent network such as a code block file chain network; this is called merged tokening. The alternative code block file chain may implement DNS, P2P currency exchanges, SSL certificate authorities, time stamping, file storage and voting systems.

The code block file chain may acts as a transaction database shared by all nodes participating in a system based on the system protocol. A full copy of the code block file chain may contain every transaction ever executed in the global world universal digital mobile and wearable currency. Thus, the system 300 may retrieve information on how much value belonged to each address at any point in history. Additionally, a private messaging protocol may be used to share distributed information. The simplest currency token private messaging protocol may be an encryption library.

In some embodiments, the system 300 may include one or more servers to index the code block file chain.

In some embodiments, the code block file chain is broadcast to all nodes on the networking using a flood protocol.

In some embodiments, the code block file chain may include a shared public ledger on which the entire network may rely. The shared public ledger may include a principal digital book or computer file for recording and totaling token transactions, with debits and credits in separate columns and a beginning monetary balance and ending monetary balance for each account. The shared public ledger may include a permanent summary of all amounts entered in supporting journals, which may list individual transactions by date. Every transaction may flow from a journal to one or more shared public ledgers. The shared public ledgers may include: digital sales ledger that may record accounts receivable; digital purchase ledger that may record money spent for purchasing; digital general ledger representing five main account types: assets, liabilities, income, expenses, and equity. These may all be included in the shared public ledger. A copy of the shared public ledger is accessible from a client device of the user.

For every debit recorded in the shared public ledger, there may be a corresponding credit so that the debits equal the credits in the grand totals.

In some embodiments, all confirmed transactions may be included in the code block file chain. This way, token wallets may calculate spendable balance and new transactions may be verified to be spending tokens that may be actually owned by a spender. The integrity and the chronological order of the code block file chain may be enforced with cryptography.

In some embodiments, a transaction may include a transfer of value between token wallets that may be included in the code block file chain. Token wallets may keep a secret piece of data using a private key, which may be used to sign transactions, providing a mathematical proof that they come from the owner of a wallet. The signature also may prevent the transaction from being altered by anybody once the transaction has been issued. All transactions may be broadcast between users and usually begin to be confirmed by the network.

In some embodiments, token wallets may use JavaScript in a browser to manage private keys and create payments. A user may actually own private keys inside the token wallet. This approach has several advantages. The user may look up his account balance in the code block file chain. The user may easily export his private keys out of the token wallet to use with another token client or wallet provider. The private keys may be stored encrypted on a server, offering protection for security breaches if strongly encrypted. As each address may have only one user, it may be less likely that misguided attempts to "return" tokens to their last-sent-to address will result in loss of tokens.

In some embodiments, the code block file chain may be a distributed transaction processing engine enabling direct operations between client devices. The distributed transaction processing engine may keep track of currency token. The currency token code block file chain may allow for data to be stored in a variety of different places while tracking the relationship between different parties to that data. Additionally, this enables tracking relationships between devices, between a user and a device and even between two devices with the consent of a user.

Figure 2:
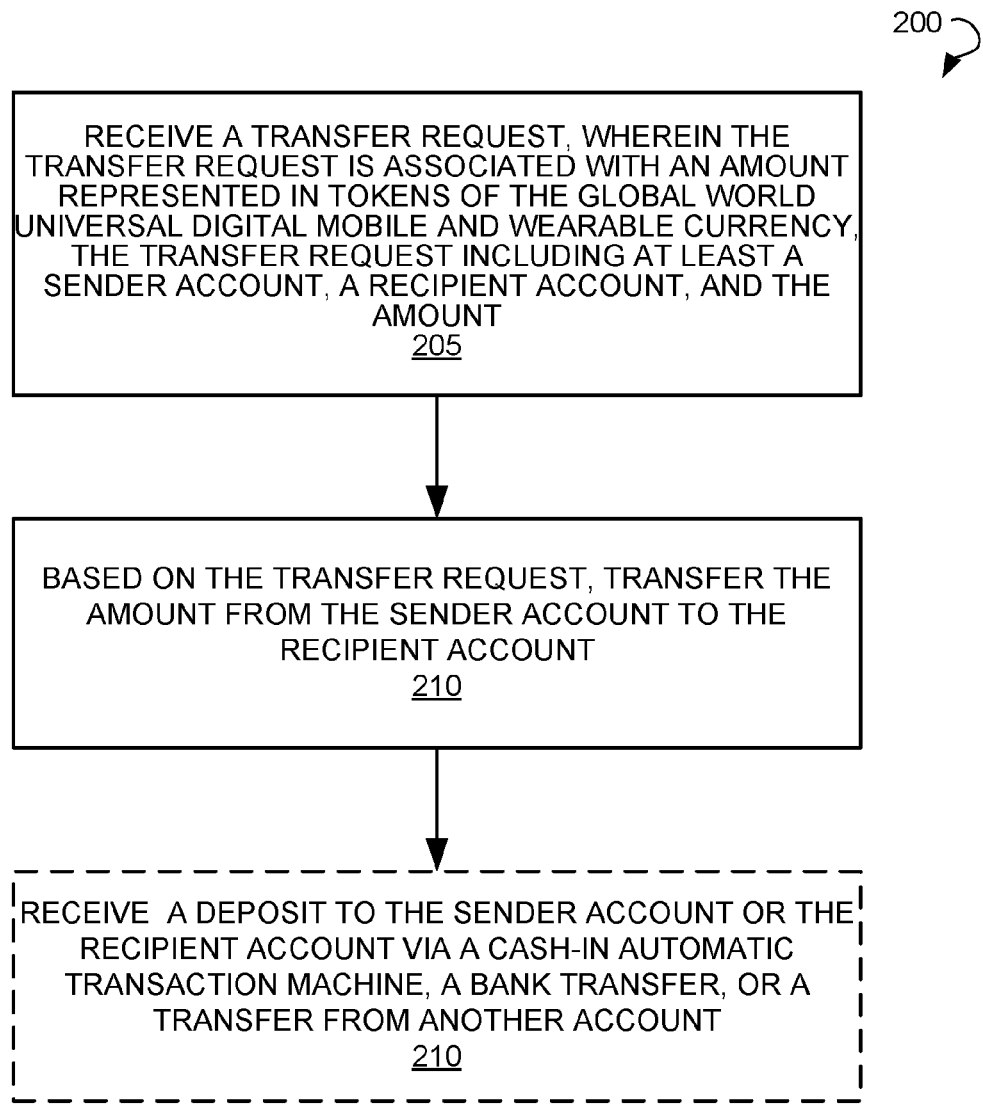
FIG. 2 is a flow chart Illustrating a method for using a global world universal digital mobile and wearable currency, in accordance with certain embodiments.

FIG. 2 is a flow chart illustrating a computer-implemented method 200 for using a global world universal digital mobile and wearable currency for mobile and wearable devices, in accordance with certain embodiments. The method 200 starts with receiving, by at least one processor, a transfer request at operation 205. The transfer request may include an amount to be transferred, a sender account, a recipient account, and so forth. The amount may be represented in tokens of the global world universal digital mobile and wearable currency. The tokens may represent different values in the global world universal digital mobile and wearable currency.

In some embodiments, the global world universal digital mobile and wearable currency may be provided collectively at a rate, which is bounded by a value both prior defined and publicly known. In centralized banking and economic systems such as the Federal Reserve System, governments control the value of currency by printing units of fiat money or demanding additions to digital banking ledgers. However, governments cannot produce units of the global world universal digital mobile and wearable currency and as such, governments cannot provide backing for firms, banks or corporate entities which hold asset value measured in a decentralized global world universal digital mobile and wearable currency. Within the system 300 for using global world universal digital mobile and wearable currency the safety, integrity and balance of all ledgers may be maintained by a community of mutually distrustful parties referred to as a token provider and token holders, members of the general public who allow their idle computers to help validate and process transactions.

In some embodiments, tokens may include money of a specific form, such as coins. In contrast to account money, tokens may be used in circulation, as are paper notes. Token may have a strong privacy feature in that tokens may work as money without the intervention of any other party in each transaction between two parties. Privacy makes money safe from interference by more powerful third parties. Where property rights are not strong, privacy may be required to protect assets and permit trade, and tokens work well in this regime.

In some embodiments, tokens may have certain hybrid forms, one of which may be blinded coins, which is a form of financial cryptography used to achieve privacy and thus safety in token transactions over the Internet. In this form, a digital packet may include a token that can be passed from one user to another user over a mobile or wireless network. However, to defend against infinite copying, the token should be rolled over at a server in an exchange for a fresh coin. Therefore, this form of tokens may be a simulation of physical tokens, as they may permit traffic analysis.

In some embodiments, another simulation of tokens may be a smart card or electronic payment card. The smart card or electronic payment card may include a token that can be carried, and the tokens may be on the card. Smart card systems may employ sophisticated tracking software in order to ensure the safety of the system and privacy of transactions.

In some embodiments, principles of financial cryptography may be used in applications in which financial loss could result from subversion of the message system, specifically a cyber-code blinded signature may be used. This special form of a cryptographic signature may permit tokens to be signed without the signer seeing the actual token, and may permit a form of digital currency that offer untraceability.

The financial cryptography may include mechanisms and algorithms necessary for the protection of global world universal digital mobile and wearable currency transfers. Proof of work and various auction protocols may fall under the umbrella of financial cryptography.

The financial cryptography may include seven distinct disciplines: cryptography, software engineering, rights, accounting, governance, value, and financial applications. Payment transaction failures may often be traced to the absence of one or more of these disciplines, or to poor application of them.

In some embodiments, users (e.g., the sender and recipient) may customize the representation of the tokens using images. For example, the user may provide his image to be depicted on a 100 unit token. The images for token customizing may include an image of a sender face, an image of a public figure, an image of a movie character, and so forth.

In some embodiments, the sender and recipient may provide each other their data using barcodes displayed on a screen of their devices. For example, the recipient, instead of notifying his account number, may cause the barcode encoding his account number to be generated and shown on the screen of his device. The sender may scan the displayed barcode using a camera of the sender device. The barcode is read to extract the recipient account. Similarly, the sender account and the payment amount may be encoded in a barcode on the sender device. The barcode may be shown on the screen of the sender device. The recipient may scan the barcode to extract the sender account and the amount.

At operation 210, the method 200 continues with transferring, by the at least one processor, the amount of the transfer request from the sender account to the recipient account based on the transfer request. The amount may be transferred without a commission or other fees. The transferring may be visualized with the customized representation of tokens. The visualizing may include representing the amount in a national currency, wherein the national currency is predefined by the user.

In various embodiments, the transferring via the system 300 may include transactional payments based on Unstructured Supplementary Service Data (USSD), Short Message Service (SMS), direct operator billing, credit card mobile payments, prepaid card payments, online wallets, QR-code payments, contactless near field communication, cloud-based mobile payments, audio signal-based payments, Bluetooth Low Energy (BLE) signal beacon payments, in-application payments, software development kit (SDK) payments, application programming interface (API) payments, social networking payments, direct carrier/bank co-operation, and the like.

The sender account and the recipient account may be accessed via a virtual wallet interface or a cloud server. In an example embodiment, the sender and/or recipient may be authorized in the system 300 by swiping a finger across a touchscreen of the mobile and wearable device associated with the sender or recipient.

Additionally, access to the system 300 may be protected by a password, a Personal Identification Number (PIN) code, biometric authorization, and so forth. The biometric authorization may include fingerprint scanning, palm scanning, face scanning, retina scanning, and s forth.

In an example embodiment, verification of the sender face may be performed to prevent an identity theft. For example, the image of the sender face may be taken by a camera of the sender digital device associated with the sender. The captured image of sender face may be recognized and compared to those stored on the sender digital device associated with the sender. In an example embodiment, the camera may recognize the sender face without capturing the image.

Biometrics may be used to recognize and match unique patterns in human faces. In an example embodiment, when a sender registers in the system 300, an image of the sender face may be provided to the system 300 and is linked to the sender account in the system 300. The sender account may be linked to a payment account (i.e. a banking account, a credit card, a debit card, and so forth) of the sender. To initiate a payment in a point-of-sale, the sender may access a barcode needed to complete a transaction from the sender account. The barcode may also contain the image of the sender face. Therefore, the barcode and the sender face may be a way of representing information. The barcode may be displayed on a display of the sender digital device. After the recipient at the point-of-sale scans the barcode, the image of the sender face may appear on a screen associated with a point-of-sale system. The recipient may use that image to verify the sender and complete the transaction.

A sender face on the global world universal digital mobile and wearable currency and face verification feature may have enhance security of transactions with the global world universal digital mobile and wearable currency.

In an example embodiment, the global world universal digital mobile and wearable currency may be a digital equivalent of virtual cash with the sender face both for sender prestige and verification of sender identity. The data related to the global world universal digital mobile and wearable currency may be stored on devices associated with the sender, recipient, and on a remote server. The global world universal digital mobile and wearable currency may be associated with one or more real currencies. Thus, the system 300 may determine equivalent value in the global world universal digital mobile and wearable currency and in the one or more real currencies.

Referring back to the FIG. 2, the method 200 may optionally include an operation 215. At the operation 215, the processor may receive a deposit to the sender account or the recipient account via a cash-in automatic transaction machine (ATM), a bank transfer, or a transfer from another account using the global world universal digital mobile and wearable currency. If the deposit is made in a national currency or any other currency other than the global world universal digital mobile and wearable currency, the deposit amount may be automatically converted in the global world universal digital mobile and wearable currency before crediting the deposit to the sender account or the recipient account.

The global world universal digital mobile and wearable currency is a decentralized universal digital currency based on peer-to-peer internet protocol. In the basis of the global world universal digital mobile and wearable currency is a public ledger that provides authentication, clearing, and settlement. The global world universal digital mobile and wearable currency is issued and managed via mobile devices or mobile networks. Payments in the global world universal digital mobile and wearable currency are protected by a digital signature and a password. The password can be in a form of an alphanumeric character, a voice, a scrambled image, a video clip, a gesture of any part of a body. The password may be entered by means of a touch screen, a keyboard, a mouse, or a camera of a device or by means of a remote control of the device.

In a further example embodiment, the global world universal digital mobile and wearable currency includes an encrypted currency, also referred to as cryptocurrency. The encrypted currency is encrypted using principles of cryptography being a technology used in online banking. Unlike fiat currency with central banks and online banking, the encrypted currency discussed herein is created using peer reviewed cryptographic ciphers, thus removing the need to trust a central authority. Thus, transfer of the encrypted currency does not require trust of any third party.

In some embodiments, the method 200 may further comprise executing currency exchange transaction between a national currency provider and a token provider. The national currency provider and token provider, directly or through an authorized mandated representative may conclude a private currencies exchange agreement. The token provider may open a multicurrency bank account for the purpose of currency exchange transaction. The national currency provider may provide to the token provider necessary documents for the multicurrency bank account opening. The currency exchange transaction may start as per the agreed schedule immediately following the activation of the multicurrency bank account. The national currency provider may transfer daily the face value of each scheduled tranche less the discount to the multicurrency bank account. The token provider may execute the exchange immediately when the funds are received on the multicurrency bank account. The balance of the face value may include a bonus to the token provider, intermediary commission, and discount. This way, fees may be paid after the performance of the token provider.

Figure 3:
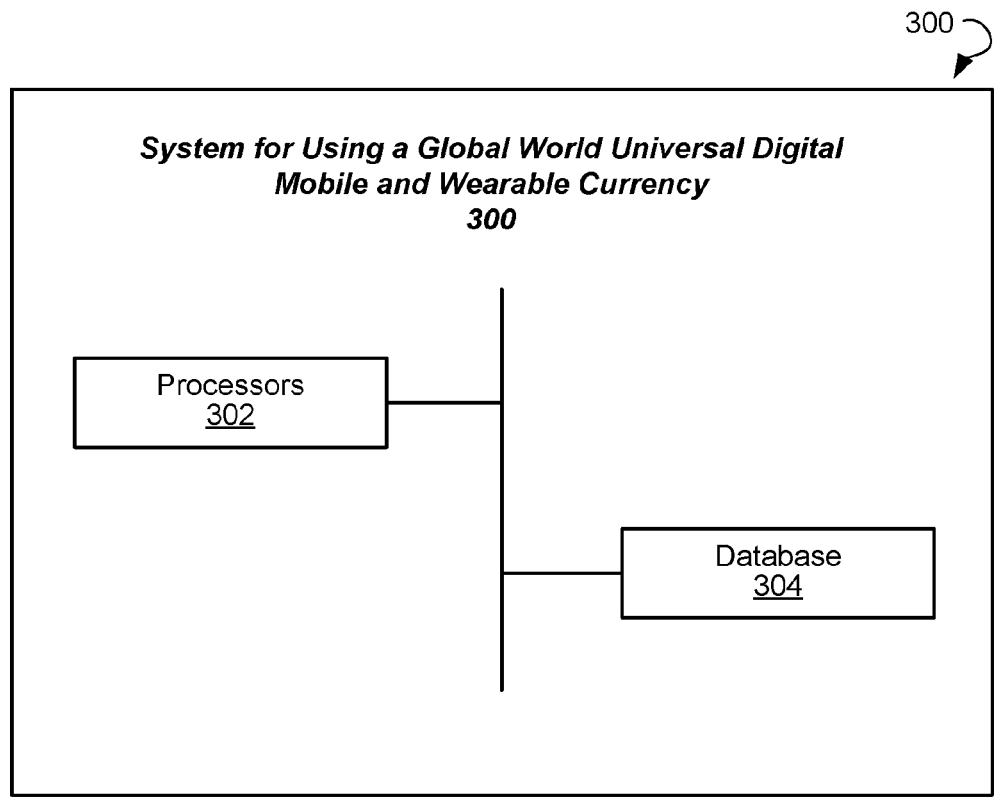
FIG. 3 is a block diagram showing various modules of a system for using a global world universal digital mobile and wearable currency, in accordance with certain embodiments.

FIG. 3 is a block diagram showing various modules of a system 300 for using the global world universal digital mobile and wearable currency, in accordance with certain embodiments. Specifically, the system 300 includes one or more processors 302. The processors 302 are operable to receive a transfer request from a sender digital device. The transfer request includes at least a sender account, a recipient account, and the amount. The amount is represented in tokens of the global world universal digital mobile and wearable currency.

Furthermore, the processors 302 are operable to transfer the amount from the sender account to the recipient account.

In certain embodiments, the processor 302 may be configured to visualize the transfer request on a screen of a client device associated with a sender. The visualized transfer request may be scannable by a Point-of-Sale (POS) system.

The transferring includes a transaction performed within a country and an international transaction. Thus, the sender and the recipient may be located in different countries and may be citizens of different countries. Transactions in the global world universal digital mobile and wearable currency eliminate boundaries and expenses associated with national currencies and facilitate international payments.

In some embodiments, the transfer request may be associated with a real currency amount. The real currency amount may be converted in the amount represented in the tokens of the global world universal digital mobile and wearable currency.

The system 300 further comprises a database 304 comprising computer-readable instructions for execution by the one or more processors 302.

In some embodiments, the system 300 may include a camera operable to scan and read a barcode from a screen of the digital device. The barcode may include electronic key data, a link to a web-resource, a payment request, advertising information, and other information, wherein one or more barcodes include a linear dimensional code, a two-dimensional code, a snap tag code, a QR code, and other machine readable codes.

Additionally, the system 300 may be adapted to enable a Bluetooth low energy payment and is compatible with a third party application.

In some embodiments, the system 300 may further comprise an external device to manage at least the data of the payments.

Figure 4:
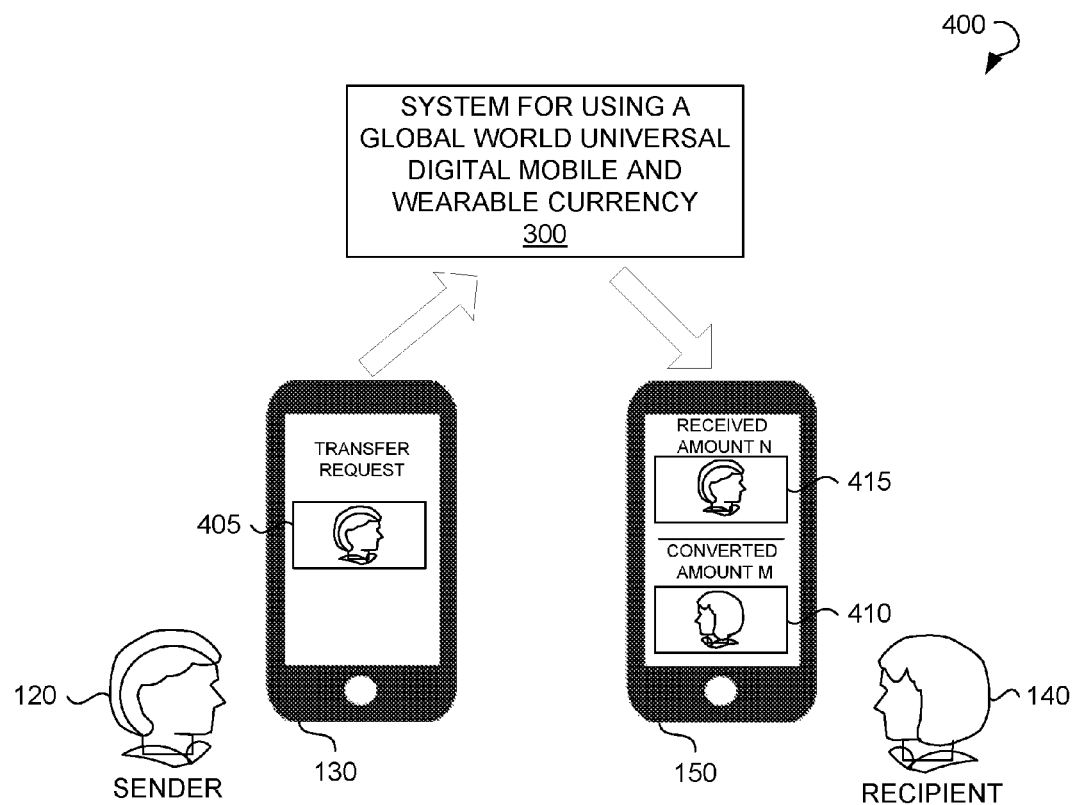
FIG. 4 is a schematic diagram for currency transfer, in accordance with certain embodiments.

FIG. 4 is a schematic diagram 400 for currency transfer between a sender 120 and a recipient 140. The sender 120 uses a sender digital device 130 to specify an amount of currency to be transferred to the recipient 140 and a recipient account. The currency may be associated with token represented on the screen of the sender digital device 130 and/or recipient digital device 140. Using the amount and the recipient account, a transfer request 405 may be formed and sent to the system 300 for using a global world universal digital mobile and wearable currency. The system 300 may process the transfer request 405 and transfer the amount 405 to the recipient account. A notification of the received amount 415 may be transmitted to the recipient digital device 150. The user may be protected by a chargeback.

In some embodiments, the recipient 140 may request to customize the received amount using at least image of the recipient 140. For example, as a result of the customization, the sender face is replaced with a recipient face.

In further embodiments, the transfer may be free of charge for users within the system for using a global world universal digital mobile and wearable currency, while a predefined commission may be set for users outside the system for using a global world universal digital mobile and wearable currency.

Figure 5:
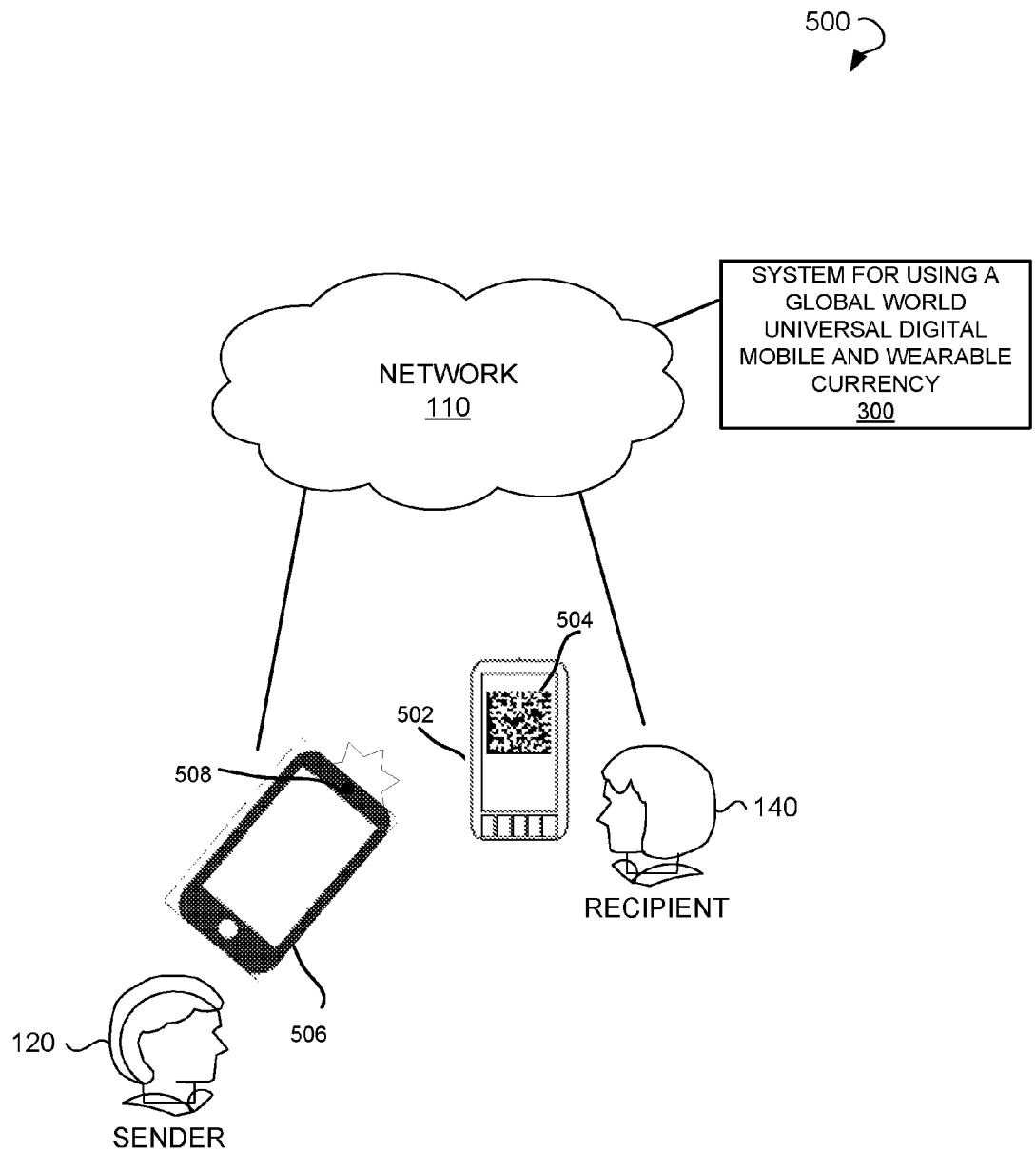
FIG. 5 is a block diagram illustrating an example of scanning barcodes displayed by mobile devices, in accordance with certain embodiments.

FIG. 5 illustrates an example scanning 500 of a barcode displayed by a recipient digital device 502. As shown, the recipient digital device 502 may be configured to display a barcode 504. The barcode 504 may encode data of the recipient 140 (for example, account number, recipient nickname in the system 300, and so forth). The barcode 504 displayed by the recipient digital device 502 is scannable by a sender digital device 506 associated with the sender 120, or another mobile device. For scanning, the sender digital device 506 may use a camera 508. The sender digital device 506 may decode the data of the recipient 140 and, based on the data, create a new contact in the system 300, use the data to generate a transfer request, or save the data for later use.

The recipient digital device 502 and the sender digital device 506 may communicate with the system 300 for using a global world universal digital mobile and wearable currency via a network 110. The network 110 may be also used for communication among various components of the system 300.

Figure 6:
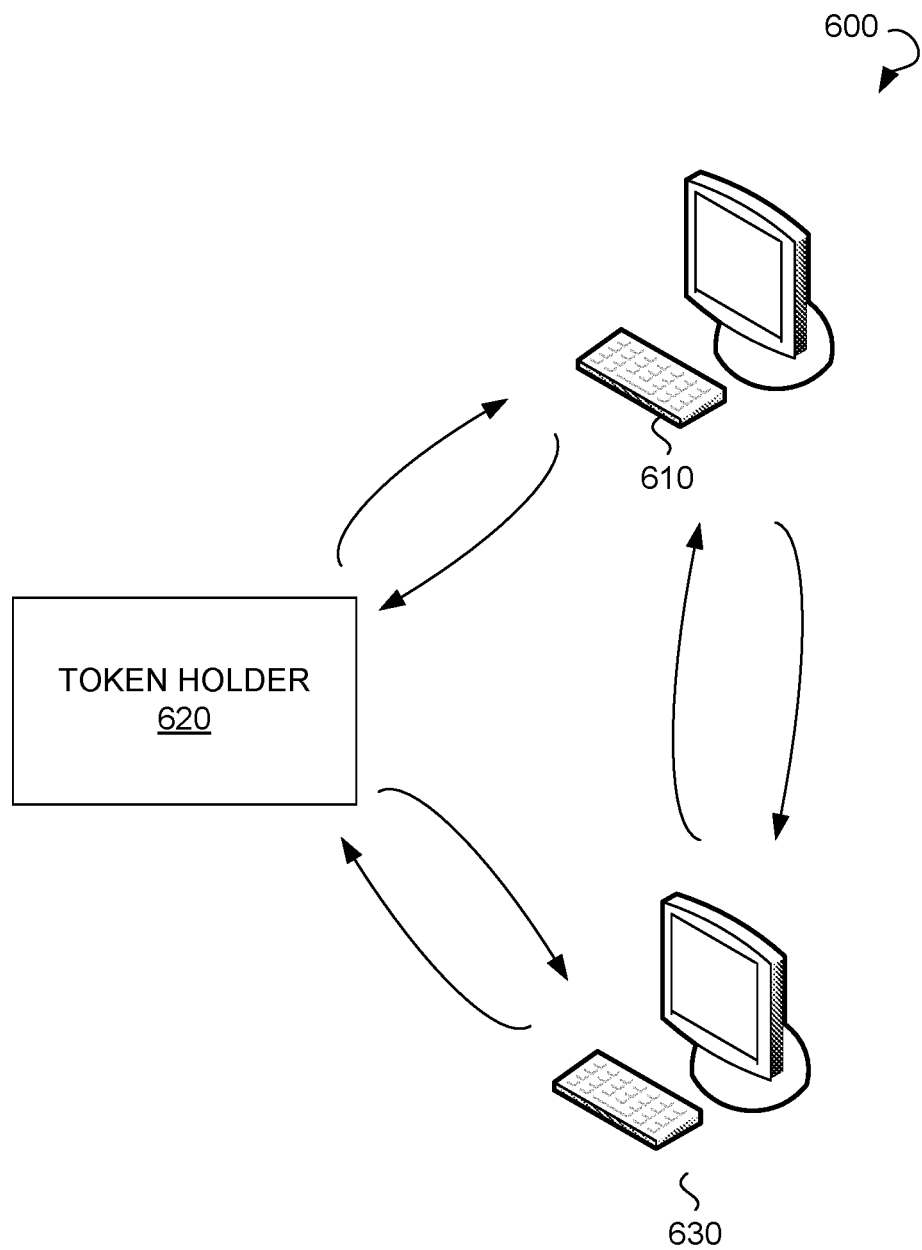
FIG. 6 is a block diagram illustrating an example of payment interaction between a token provider, a token holder, and a merchant, in accordance with certain embodiments.

FIG. 6 is a block diagram illustrating an example of payment interaction between a token provider, a token holder, and a merchant. Monetary value may be represented by electronic tokens, which include pieces of data signed by the token holder 620. The token holder 620 may be the entity authorized to generate tokens. The token holder 620 may issue tokens to the token holder 630, who may utilize the tokens to pay the merchant 610. Later the merchant 610 may deposit the tokens that he received from the token holder 630 to his account associated with the token provider 620. After the deposit process the token provider 620 may verify whether the tokens are valid, i.e. check for forgery and fraud. When verification is completed, parties may complete a transaction.

Figure 7:
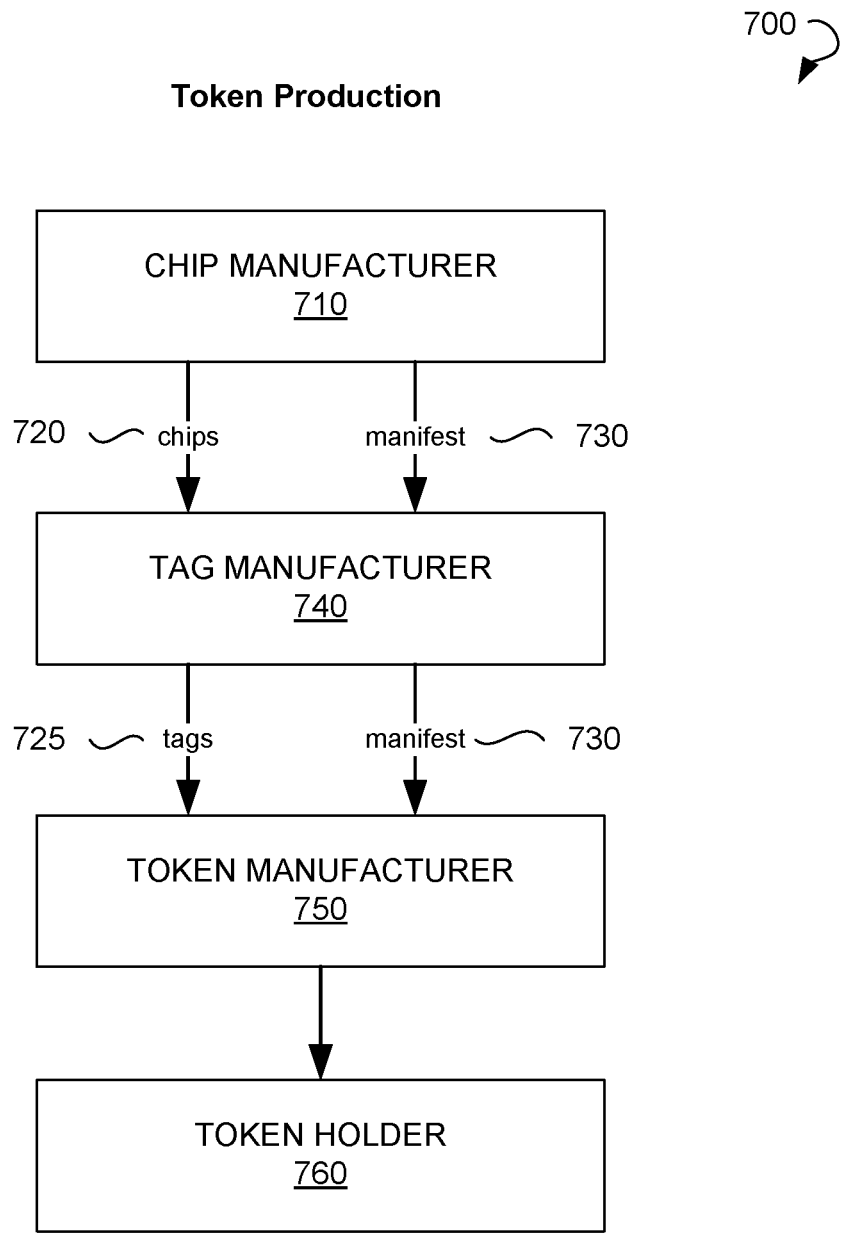
FIG. 7 is a block diagram illustrating an example embodiment of a token production, in accordance with certain embodiments.

FIG. 7 is a block diagram illustrating an example embodiment of a token production.

Token production 700 may begin with chip manufacturing 710. At this step, a chip may be programmed with information relating to a monetary value, denomination, serial number, and other manufacturing information. The information programmed into the chip may be used to generate a manifest. The manifest may be updated with information relating to the status of each chip produced in series. After the chip manufacturing process is completed, the chips 720 and associated manifest 730 may be provided to a tag manufacturer 740.

The tag manufacturer 740 may receive the chips 720 and the associated manifest 730. The manifest 730 may be in an electronic form that is readable by any computer system, such as a CD, DVD, flash memory stick, and the like. The tag manufacturer 740 may then update and modify the manifest 730 during the manufacturing process of producing tags. In this way, the manifest may comprise historical information about each tag. At each stage of the manufacturing process, the manifest 730 may be updated with information regarding each stage and with information regarding the token and sub-parts. Once the tag manufacturer 740 has completed the manufacturing process, both the tags 725 and the updated manifest 730 may be sent to token manufacturer 750 for further processing.

The token manufacturer 750 may then begin the process of producing a token with the proper face value and ornamental structure. The ornamental structure may include a color scheme, texture, look and feel, or other distinguishing characteristics of the token. The manifest may include image files showing the appearance of the token. The token may have a color scheme and currency value either printed on or molded into the token. After the token manufacturing is completed, the token may be provided to a token holder 760.

Figure 8:
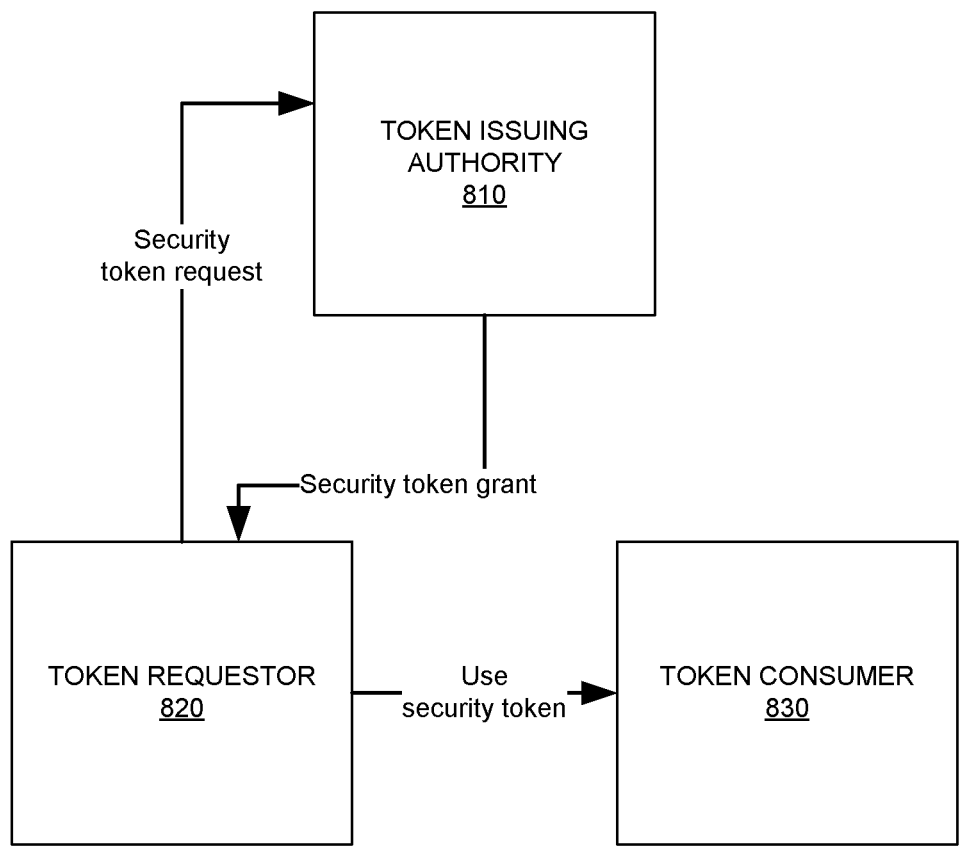
FIG. 8 is a block diagram illustrating an example environment, within which a security token may be used, in accordance with certain embodiments.

FIG. 8 is a block diagram illustrating an example environment, within which a security token may be used, in accordance with certain embodiments.

Within the environment 800, a token requestor 820 may place a request for a security token at the token issuing authority 810. This security token may be required to communicate and request access to a service provided by a token consumer 830 who accepts the security token. The token requestor 820 may be a partner of the token issuing authority 810, which may be registered with the token issuing authority 810. The token requestor 820 may be an end user and may be registered with the token issuing authority 810. The token issuing authority 810 may receive and process a security token request and returns the security token, as follows: authenticate the input credentials, authorize the security token request based on a token issuance policy that specifies which token requestors are authorized to request a security token for a given token consumer. The token consumer 830 (typically a service provider) may accept the security token as part of the service request and provide service based on the validity of the input security token and validate the input security token with the token issuing authority 810.

In some embodiments, the system 300 may have a network of gateways built on top of token. The gateways may be technology-driven companies in an open ecosystem. Every entity on the network may have a payment address that resembles an email address. To pay on a site, the user may provide the payment address. The merchant gateway may then request funds from the gateway of the user, which the user may authorize via a push notification on his client device.

Thus, human-readable names (for example, alice@cadgateway.com) may facilitate remembering the payment address. Behind the scenes, system 300 may use global currency image token addresses for communication.

Figure 9:
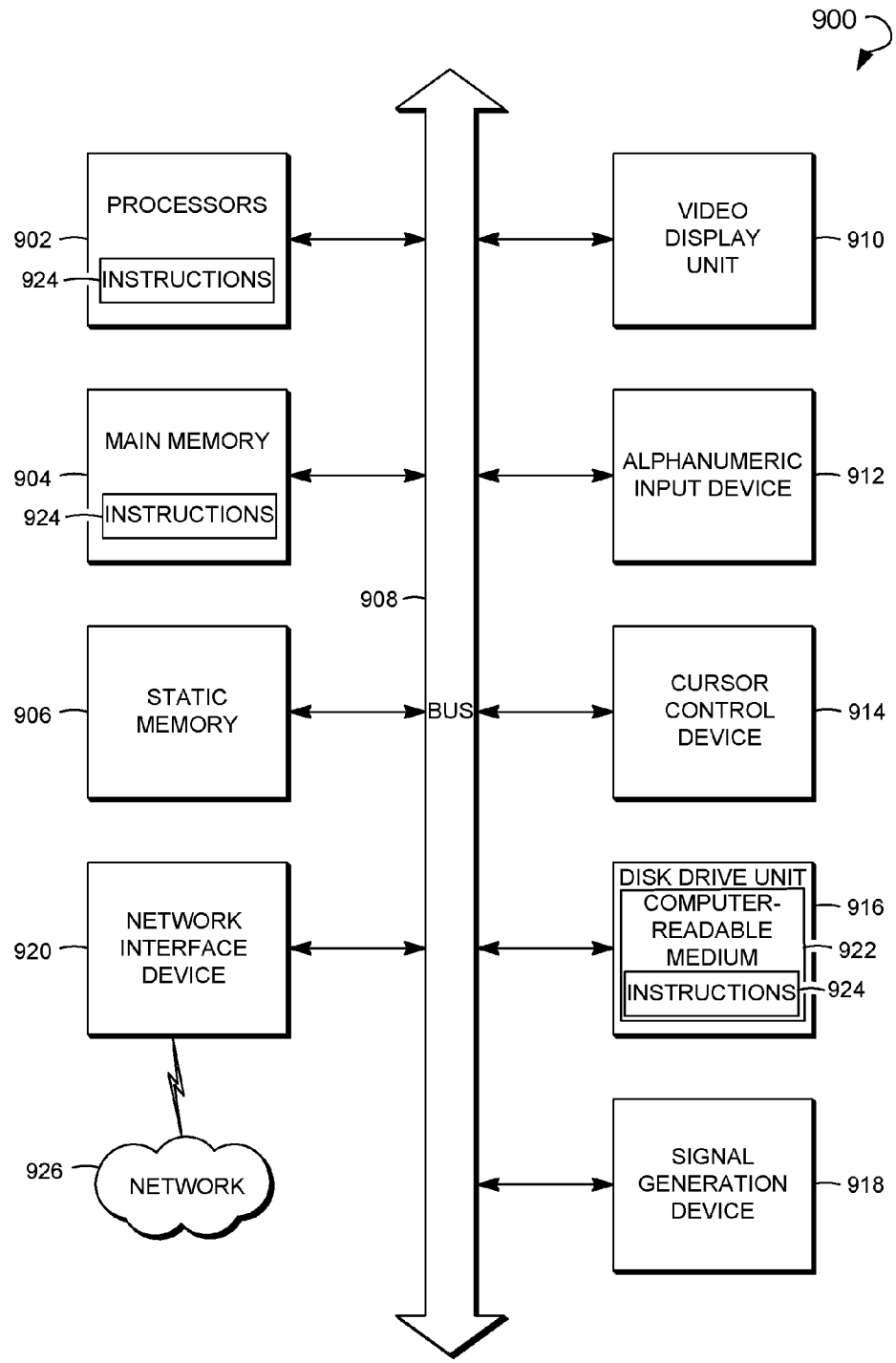
FIG. 9 is a schematic diagram illustrating an example of a computer system for performing any one or more of the methods discussed herein.

FIG. 9 shows a diagrammatic representation of a machine in the example electronic form of a computer system 900, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor or multiple processors 902 (e.g., a central processing unit (CPU), a graphics processing unit (GPU), or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 may also include an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 includes a computer-readable medium 922, on which is stored one or more sets of instructions and data structures (e.g., instructions 924) embodying or utilized by any one or more of the methodologies or functions described herein. The instructions 924 may also reside, completely or at least partially, within the main memory 904 and/or within the processors 902 during execution thereof by the computer system 900. The main memory 904 and the processors 902 may also constitute machine-readable media.

The instructions 924 may further be transmitted or received over a network 926 via the network interface device 920 utilizing any one of a number of well-known transfer protocols (e.g., Hyper Text Transfer Protocol (HTTP)).

While the computer-readable medium 922 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, various systems and methods for facilitating mobile and wearable device payments and multimedia transfer have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A computer implemented method for multimedia capture, payment transactions, digital global ledger and national currency digital token for mobile and wearable devices, the method comprising: receiving, by one or more processors, a first input of a user; in response to the first input of the user, initiating one or more sensors to capture multimedia to obtain captured multimedia; receiving, by the one or more processors, a second input of the user, wherein the first input of the user includes a touch engagement of the user with a display of a mobile and wearable device and the second input of the user includes a touch release of the user from the display of the mobile and wearable device; analyzing, by the one or more processors, data associated with the first input of the user and the second input of the user, wherein the analyzing includes determining time between the first input of the user and the second input of the user; based on the analysis, selectively selecting, by the one or more processors, a multimedia capture mode or a payment transaction mode, wherein the multimedia capture mode comprises the user using the mobile and wearable device to capture multimedia content, wherein the selection of the multimedia capture mode and the transaction mode is determined by comparison of the time between the first input and the second input with a predetermined time, wherein only a multimedia storing mode or a transaction mode can be selected at a single time, and wherein the multimedia capture mode is associated with a plurality of types of multimedia, wherein each of the plurality of types of multimedia being captured are determined by the time between the first input and second input in the multimedia capture mode; based on the analysis, selectively selecting, by the one or more processors, one of multimedia storing modes or a payment transaction mode, wherein each of the multimedia storing modes is associated with at least one of a plurality of types of the multimedia; in response to the selection of the multimedia capture storing modes, processing, by the one or more processors, the captured multimedia to obtain a type of the multimedia captured in the multimedia capture mode; storing, by the one or more processors, the type of the multimedia captured and the captured multimedia to a database to obtain a stored type of the multimedia; in response to the selection of the payment transaction mode, receiving, by the one or more processors, transaction data, wherein the transaction data comprises at least a payment amount and a recipient; based on the transaction data, user payment data, and recipient payment data, performing, by the one or more processors, a payment transaction, wherein the user payment data and the recipient payment data are stored in the database; wherein the mobile and wearable devices include at least one of a handheld computing device, a smartphone, a tablet computer, a personal digital assistant, a e-textile item, an activity tracker, a smartwatch, smartglasses, a Global Positioning System (GPS) watch, a mixed reality device, a computer-mediated reality device, a clothing technology device, and a wearable device, the wearable device having a band adapted to secure the wearable device on a human body, the human body including a wrist, an arm, a neck, a head, a leg, a waist, an ear, a finger, and any other part of the human body, wherein the band is adapted to secure the wearable device under, within or on clothing, and wherein the band includes a rechargeable battery configured to power the wearable device; the method further comprising the use of a global world universal digital mobile and wearable currency, the method further comprising: receiving, by at least one processor, a transfer request, wherein the transfer request is authorized upon receiving authorization data from a sender having a sender account from which funds are transferred from, the authorization data comprising a password, personal identification number (PIN) code, and biometric data comprising a face of the sender; and based on the receiving, authorizing the sender to provide the transfer request when the authorization data providing for the transfer request matches previously registered corresponding authorization data; wherein the transfer is associated with an amount represented in tokens of the global world universal digital mobile and wearable currency stored on the mobile and wearable device of the sender, the transfer request including at least the sender account, a recipient account, and the amount; and based on the transfer request, by the at least one processor, prior to transferring, encrypting the currency by assigning a unique key to the transferring and signing the global world universal digital mobile and wearable currency using a cryptographic signature the amount from the sender account to the recipient account wherein the tokens stored on the mobile and wearable device of the sender are printed with a face of the sender, and upon transfer from the mobile and wearable device of the sender to a mobile and wearable device of the recipient, the tokens are converted by replacing the senders face with the recipient face, wherein the currency is not a currency of any national government but is operable to be exchanged by the mobile device into a user defined national currency.

2. The method of claim 1, wherein the global world universal digital mobile and wearable currency is an encrypted currency, wherein encrypting includes assigning a unique key to the transferring and signing the global world universal digital mobile and wearable currency using cryptographic signature.

3. The method of claim 1, further comprising:
visualizing, by the at least one processor, the transferring by representation of the tokens, wherein the visualizing includes representing the amount in a national currency, wherein the national currency is predefined by the user.

4. The method of claim 1, wherein the user provides at least one image, the at least one image being depicted on the tokens, wherein the image includes an image of a sender face, an image of a public figure, an image of a movie character, and other images.

5. The method of claim 1, wherein the transferring includes a transaction performed within a country and an international transaction, the international transaction being performed over one or more regional borders.

6. The method of claim 1, wherein the transferring is performed without a commission.

7. The method of claim 1, further comprising:
scanning, by a camera, a barcode, wherein the barcode encodes the recipient account, wherein the barcode is shown on a display of a device associated with a recipient;
reading, by the at least one processor, the barcode to extract the recipient account;
scanning, by a camera, a barcode, wherein the barcode encodes the sender account and the amount, and wherein the barcode is shown on a display of a device associated with a sender; and
reading, by the at least one processor, the barcode to extract the sender account and the amount.

8. The method of claim 1, wherein the transfer request is associated with a real currency amount, the real currency amount being converted in the amount represented in the tokens of the global world universal digital mobile and wearable currency.

9. The method of claim 1, wherein the global world universal digital mobile and wearable currency is issued and managed via mobile devices or mobile networks, wearable devices, internet-connected devices, internet of things devices, and in-apps environment.

10. The method of claim 1, further comprising:
receiving, by the at least one processor, a deposit to the sender account or the recipient account via a cash-in automatic transaction machine (ATM), a bank transfer, a bank mobile account, a bank checking account, a bank savings account, paper notes, electronic credits, electronic debits, credit card, debit card, prepaid card, gift card, gold, stock, and other monetary and other virtual currencies or a transfer from another account using the global world universal digital mobile and wearable currency;
storing at least one asset represented by tokens in a code block file chain;
executing currency exchange transaction between a national currency provider and a token provider.

11. A system for using a global world universal digital mobile and wearable currency, the system comprising: at least one processor operable to: receive a transfer request, wherein the transfer request is authorized upon receiving authorization data from a sender having a sender account from which funds are transferred from, the authorization data comprising a password, personal identification number (PIN) code, and biometric data comprising a face of the sender; and based on the receiving, the at least one processor is operable to authorize the sender to provide the transfer request when the authorization data providing for the transfer request matches previously registered corresponding authorization data; wherein the transfer is associated with an amount represented in tokens of the global world universal digital mobile and wearable currency stored on the mobile and wearable device of the sender, the transfer request including at least the sender account, a recipient account, and the amount; and based on the transfer request, the at least one processor is further operable to, prior to transferring, encrypt the currency by assigning a unique key to the transferring and signing the global world universal digital mobile and wearable currency using a cryptographic signature the amount from the sender account to the recipient account wherein the tokens stored on the mobile and wearable device of the sender are printed with a face of the sender, and upon transfer from the mobile and wearable device of the sender to a mobile and wearable device of the recipient, convert the tokens by replacing the senders face with the recipient face, wherein the currency is not a currency of any national government but is operable to be exchanged by the mobile device into a user defined national currency; a database comprising computer-readable instructions for execution by the at least one processor; the system receiving, by one or more processors, a first input of a user; in response to the first input of the user, the at least one processor initiating one or more sensors to capture multimedia to obtain captured multimedia; receiving, by the at least one processor, a second input of the user, wherein the first input of the user includes a touch engagement of the user with a display of a mobile and wearable device and the second input of the user includes a touch release of the user from the display of the mobile and wearable device; analyzing, by the one or more processors, data associated with the first input of the user and the second input of the user, wherein the analyzing includes determining time between the first input of the user and the second input of the user; the one or more processors, based on the analysis, being operable to selectively select a multimedia capture mode or a payment transaction mode, wherein the multimedia capture mode comprises the user using the mobile and wearable device to capture multimedia content, wherein the selection of the multimedia capture mode and the transaction mode is determined by comparison of the time between the first input and the second input with a predetermined time, wherein only a multimedia storing mode or a transaction mode can be selected at a single time, and wherein the multimedia capture mode is associated with a plurality of types of multimedia, wherein each of the plurality of types of multimedia being captured are determined by the time between the first input and second input in the multimedia capture mode; based on the analysis, the one or more processors being operable to selectively select one of multimedia storing modes or a payment transaction mode, wherein each of the multimedia storing modes is associated with at least one of a plurality of types of the multimedia; in response to the selection of the multimedia capture storing modes, the one or more processors being operable to process the captured multimedia to obtain a type of the multimedia captured in the multimedia capture mode; the one or more processors being operable to store the type of the multimedia captured and the captured multimedia to a database to obtain a stored type of the multimedia; in response to the selection of the payment transaction mode, receiving, by the one or more processors, transaction data, wherein the transaction data comprises at least a payment amount and a recipient; based on the transaction data, user payment data, and recipient payment data, performing, by the one or more processors, a payment transaction, wherein the user payment data and the recipient payment data are stored in the database; wherein the mobile and wearable devices include at least one of a handheld computing device, a smartphone, a tablet computer, a personal digital assistant, a e-textile item, an activity tracker, a smartwatch, smartglasses, a Global Positioning System (GPS) watch, a mixed reality device, a computer-mediated reality device, a clothing technology device, and a wearable device, the wearable device having a band adapted to secure the wearable device on a human body, the human body including a wrist, an arm, a neck, a head, a leg, a waist, an ear, a finger, and any other part of the human body, wherein the band is adapted to secure the wearable device under, within or on clothing, and wherein the band includes a rechargeable battery configured to power the wearable device.

12. The system of claim 11, further comprising:
   a camera operable to scan a barcode, wherein the barcode encodes the sender account and the amount, and wherein the barcode is shown on a display of a device associated with a sender, the at least one processor being further operable to read the barcode to extract the sender account and the amount, and wherein the barcode barcodes including electronic key data, a link to a web-resource, a payment request, advertising information, and
   other information, wherein one or more barcodes includes a linear dimensional code, a two-dimensional code, a snap tag code, a Quick Responxse (QR) code, and other machine readable codes.

13. The system of claim 11, wherein the global world universal digital mobile and wearable currency is a decentralized universal digital currency based on peer-to-peer internet protocol, and wherein payments in the global world universal digital mobile and wearable currency are protected by a digital signature and a password, the password being in a form of an alphanumeric character, a voice, a scrambled image, a video clip, a gesture of any part of a body, and wherein the password is entered by means of a touch screen, a keyboard, a mouse, or a camera of a device or by means of a remote control of the device.

14. The system of claim 11, wherein the sender account and the recipient account are accessed via a virtual wallet interface or a cloud server via cross-platform instant message subscription services, cross-platform multimedia services, free VOIP, free OTT.

15. The system of claim 11, wherein the tokens have a shape of coins, paper notes, art form with images on them and are used in money circulation.

16. The system of claim 11, further comprising a code block file chain, wherein the code block file chain includes a transaction database shared by nodes associated with the system for using a global world universal digital mobile and wearable currency, the transferring being recorded in the code block file chain in escrow and mediation services.

17. The system of claim 16, wherein the code block file chain includes a shared public ledger, the shared public ledger including a digital file for recording and totaling token transactions and being controlled using cryptography, and wherein a copy of the shared public ledger is accessible from a client device of the user.

18. The system of claim 16, wherein the code block file chain is a distributed transaction processing engine enabling direct operations between client devices.

19. The system of claim 16, further comprising one or more servers, wherein the one or more servers index the code block file chain.

20. The system of claim 19, wherein a transaction associated with the transfer request is signed using a private key, the shared public ledger confirming the transaction based on the private key.

21. The system of claim 19, wherein a transaction associated with the transfer request is verified using a public hash.

22. The system of claim 11, wherein a private messaging protocol is used to share distributed information.

23. The system of claim 11, further comprising at least one hybrid wallet configured to manage private keys and effect payments associated with the global world universal digital mobile and wearable currency.

24. The system of claim 11, wherein the transfer request includes providing a payment address associated with the user.

25. The system of claim 11, wherein the transfer is free of charge for users within the system for using a global world universal digital mobile and wearable currency and the transfer is performed with a predefined commission for users outside the system for using a global world universal digital mobile and wearable currency.

26. The system of claim 25, wherein the system is adapted to enable a Bluetooth low energy payment, wireless mesh networking to enable mobile and wearable devices to connect via Bluetooth, Wi-Fi, or apple's multi-peer connectivity peer-to-peer without an internet connection and is compatible with a third party application.

27. The system of claim 25, wherein the transfer request is associated with one or more of a transactional payment based on Unstructured Supplementary Service Data (USSD), Short Message Service (SMS), direct operator billing, a credit card mobile payment, an online wallet, a Quick Response (QR) code payment, contactless near field communication payments, a cloud-based mobile payment, an audio signal-based payment, a Bluetooth Low Energy (BLE) signal beacon payment, an in-application payment, a Software Development Kit (SDK) payment, an Application Programming Interface (API) payment, a social networking payment, and a direct carrier and bank co-operation.

28. The system of claim 25, wherein the at least one processor is further configured to visualize the transfer request on a screen of a client device associated with a sender, the visualizing being scannable by a Pointof-Sale (POS) system.

29. The system of claim 11, wherein the at least one processor is further configured to:
   receive authorization data from a sender, the authorization data including a password, a Personal Identification Number (PIN) code, and
   biometric data; and
   based on the receiving, authorize the sender to provide the transfer request.

30. A non-transitory computer-readable medium comprising instructions, which when executed by one or more processors, perform the following operations: receiving, by at least one processor, a transfer request, wherein the transfer request is authorized upon receiving authorization data from a sender having a sender account from which funds are transferred from, the authorization data comprising a password, personal identification number (PIN) code, and biometric data comprising a face of the sender; and based on the receiving, authorizing the sender to provide the transfer request when the authorization data providing for the transfer request matches previously registered corresponding authorization data; wherein the transfer is associated with an amount represented in tokens of the global world universal digital mobile and wearable currency stored on the mobile and wearable device of the sender, the transfer request including at least the sender account, a recipient account, and the amount; and based on the transfer request, by the at least one processor, prior to transferring, encrypting the currency by assigning a unique key to the transferring and signing the global world universal digital mobile and wearable currency using a cryptographic signature the amount from the sender account to the recipient account wherein the tokens stored on the mobile and wearable device of the sender are printed with a face of the sender, and upon transfer from the mobile and wearable device of the sender to a mobile and wearable device of the recipient, the tokens are converted by replacing the senders face with the recipient face, wherein the currency is not a currency of any national government but is operable to be exchanged by the mobile device into a user defined national currency; receiving, by one or more processors, a first input of a user; in response to the first input of the user, initiating one or more sensors to capture multimedia to obtain captured multimedia; receiving, by the one or more processors, a second input of the user, wherein the first input of the user includes a touch engagement of the user with a display of a mobile and wearable device and the second input of the user includes a touch release of the user from the display of the mobile and wearable device; analyzing, by the one or more processors, data associated with the first input of the user and the second input of the user, wherein the analyzing includes determining time between the first input of the user and the second input of the user; based on the analysis, selectively selecting, by the one or more processors, a multimedia capture mode or a payment transaction mode, wherein the multimedia capture mode comprises the user using the mobile and wearable device to capture multimedia content, wherein the selection of the multimedia capture mode and the transaction mode is determined by comparison of the time between the first input and the second input with a predetermined time, wherein only a multimedia storing mode or a transaction mode can be selected at a single time, and wherein the multimedia capture mode is associated with a plurality of types of multimedia, wherein each of the plurality of types of multimedia being captured are determined by the time between the first input and second input in the multimedia capture mode; the analysis, selectively selecting, by the one or more processors, one of multimedia storing modes or a payment transaction mode, wherein each of the multimedia storing modes is associated with at least one of a plurality of types of the multimedia; in response to the selection of the multimedia capture storing modes, processing, by the one or more processors, the captured multimedia to obtain a type of the multimedia captured in the multimedia capture mode; storing, by the one or more processors, the type of the multimedia captured and the captured multimedia to a database to obtain a stored type of the multimedia; in response to the selection of the payment transaction mode, receiving, by the one or more processors, transaction data, wherein the transaction data comprises at least a payment amount and a recipient; based on the transaction data, user payment data, and recipient payment data, performing, by the one or more processors, a payment transaction, wherein the user payment data and the recipient payment data are stored in the database; wherein the mobile and wearable devices include at least one of a handheld computing device, a smartphone, a tablet computer, a personal digital assistant, a e-textile item, an activity tracker, a smartwatch, smartglasses, a Global Positioning System (GPS) watch, a mixed reality device, a computer-mediated reality device, a clothing technology device, and a wearable device, the wearable device having a band adapted to secure the wearable device on a human body, the human body including a wrist, an arm, a neck, a head, a leg, a waist, an ear, a finger, and any other part of the human body, wherein the band is adapted to secure the wearable device under, within or on clothing, and wherein the band includes a rechargeable battery configured to power the wearable device.

* * * * *